United States Patent [19]

Karp et al.

[11] Patent Number: 5,801,977
[45] Date of Patent: Sep. 1, 1998

[54] SYSTEM AND METHOD FOR CLIPPING INTEGERS

[75] Inventors: Alan H. Karp, Palo Alto, Calif.; Dennis Brzezinski, Austin, Tex.; Rajiv Gupta, Los Altos, Calif.

[73] Assignee: Hewlett-Packard Company, Palo Alto, Calif.

[21] Appl. No.: 826,817

[22] Filed: Apr. 7, 1997

Related U.S. Application Data

[63] Continuation-in-part of Ser. No. 373,739, Jan. 17, 1995, abandoned.

[51] Int. Cl.$^6$ ........................................... G06F 7/38
[52] U.S. Cl. ........................................... 364/745.03
[58] Field of Search .......................... 364/736.5, 737, 364/745.01, 745.02, 745.03, 748.02, 748.03, 748.04

[56] References Cited

U.S. PATENT DOCUMENTS

| 4,402,368 | 3/1995 | Yamada et al. | 364/745.03 |
| 5,164,914 | 11/1992 | Anderson | 364/745.03 |
| 5,369,438 | 11/1994 | Kim | 364/745.03 X |
| 5,504,697 | 4/1996 | Ishida | 364/745.03 |
| 5,539,685 | 7/1996 | Otaguro | 364/757 |

FOREIGN PATENT DOCUMENTS

| 2269922 | 2/1994 | United Kingdom | G06F 7/38 |
| 4304198 | 8/1994 | United Kingdom | G06F 7/52 |

*Primary Examiner*—Chuong Dinh Ngo

[57] ABSTRACT

A circuit and method for clipping input integers to a specified range comprising the steps of providing a mask wherein a bit is set for each out-of-range bit and not set for in-range bits and applying the mask to input integers so that any integers outside of the range is clipped to the quantity in the range closest to the integer, thereby producing output integers within a range specified by the mask. Other systems and methods are disclosed.

27 Claims, 7 Drawing Sheets

SYSTEM AND METHOD FOR CLIPPING INTEGERS

CROSSREFERENCE TO RELATED APPLICATIONS

This application is a continuation-in-part application of Ser. No. 08/373,739, filed Jan. 17, 1995, and entitled "SYSTEM AND METHOD FOR CLIPPING INTEGERS now abandoned".

BACKGROUND OF THE INVENTION

The present invention relates to data processing systems and, more particularly, to a method and apparatus for parallel integer clipping.

Since their first use, computers have evolved dramatically. The first computers were primarily used for numerical calculations. As the storage and retrieval capabilities of computers improved, computers were used largely for data management. Whereas in the past computer storage was primarily used for storing text and numerical information, modern computers have storage capabilities sufficiently large to store large quantities of image data.

Another dramatic change in computers is vast improvement in processor speed. Increased processor speed has also lead to many new applications.

Parallel to the evolution of computers has been the evolution of video and sound technology, as well as communications technology. These technologies have become increasingly computerized.

A result of the parallel evolution of these technologies is the merging of applications, for example, enabling a user to interact with stored images and sound. The merging of video and audio technologies with computing is often called Multimedia. Multimedia relies both on modern computers' abilities for large data storage and for rapid calculations.

An important functionality for multimedia applications is the ability to transmit images and sequences of images from one computer to another over existing communication networks, such as telephone networks. The data that needs to be transmitted is huge. For example, one color image on a SVGA terminal requires 780K bytes of data. A sequence of images, such as a motion picture, may contain billions of bytes. Unfortunately, the bandwidth of now existing networks tends to be very narrow. To solve the problem of transmitting large quantities of data over narrow bandwidth networks, several industry standard image compression techniques have been devised, e.g., MPEG, JPEG, and H.261. These techniques are continuously being refined. Therefore, while it has been possible to design processors for executing particular compression techniques, it is very difficult to design a processor that may be programmed to handle anyone of the current and future compression techniques.

MPEG, JPEG, H.261 and other compression techniques have in common that they perform integer arithmetic operations on the numerical representation of the images they compress. These operations may result in numerical quantities outside the allowed range of the hardware. Consider, for example, that certain standards allow only eight bits per pixel. It would not be unusual for compression operations to produce pixel values with 11–12 significant bits. When it is attempted to display such values on a hardware display with an eight bit per pixel limit, the result is unpredictable. Therefore, it is necessary to clip the results to an acceptable range.

In the prior art, byte clipping to unsigned integer values has been accomplished with the following sequence:

if $(ix<0)ix=0$;

if $(ix>255)ix=255$.

Unfortunately, when translated into machine code, this simple sequence results in code with two compare operations and two branches. Furthermore, unless multiple-processors are used, the sequence would have to be executed sequentially on all pixels in an image. Because the bus width and register width of most modern computers is much greater than 8 or 16 bits, performing the clipping operation one pixel at a time does not use the full capability of the computer.

Some architectures, for example RISC, have only a limited number of opcodes. In these architectures it is therefore important to provide new functionality without adding substantially to the number of opcodes used in processors. One such functionality is the clipping of integers to specified ranges. It is therefore desirable to provide these computers or processors with the capability of clipping integers to a specified range using only one machine instruction.

It is therefore desirable to provide a general purpose computer or an image processor with the capability of rapidly clipping integers. It is also desirable to provide a computer or processor with the capability of clipping integers in parallel. Thus, there is a definite need for an improved technique for high-speed clipping of integers.

SUMMARY OF THE INVENTION

Broadly speaking, the invention enables parallel clipping of integer values. Hardware incorporating the invention contains means for storing input data to be clipped. The input data is sub-divided into one or more input blocks which are clipped in parallel. The hardware also contains means for storing a mask. The mask is applied to the input data such that integers that are larger than the largest integer of a specified output range are replaced with that largest integer, and, conversely, integers that are smaller than the smallest integer of the output range are replaced with that smallest number. In the preferred embodiment, all bits of the input data word are operated upon in parallel.

The mask defines the range of the output data. The necessity of clipping an integer is determined by comparing the mask bits to corresponding data bits. Generally, if at least one set mask bit corresponds to a set data bit, clipping is necessary. If clipping is not necessary, the input data block is passed through to the output data block with any required movement of sign bit. If clipping is necessary, a clip signal is set to indicate to the hardware to force in the required smallest or largest integer into the output block.

The invention allows clipping from both signed and unsigned input data and to both signed and unsigned output data in any combination. However, it is generally not preferred to clip unsigned input to signed output. The data type of the input and output may be either encoded in the clip opcode, encoded into the mask, or in combination of opcode and mask.

It is an object of the invention to allow parallel integer clipping.

It is a further object of the invention to provide for parallel integer clipping and to provide alternate embodiments which can perform the parallel clipping function with the minimum number of opcodes used in a processor.

DETAILED DESCRIPTION OF THE INVENTION

The invention is intended for use in a general purpose computer processor or any other programmable processor. The invention enables the processor to clip integers using a single assembly language instruction. Furthermore, on processors having a bus width wider than the width of unclipped integers, the invention permits the clipping of several integers in parallel.

Several embodiments of the invention are discussed below with reference to FIGS. 1 through 6. However, those skilled in the art will readily appreciate that the detailed description given herein with respect to these figures is for explanatory purposes as the invention extends beyond these limited embodiments.

Figure 1:
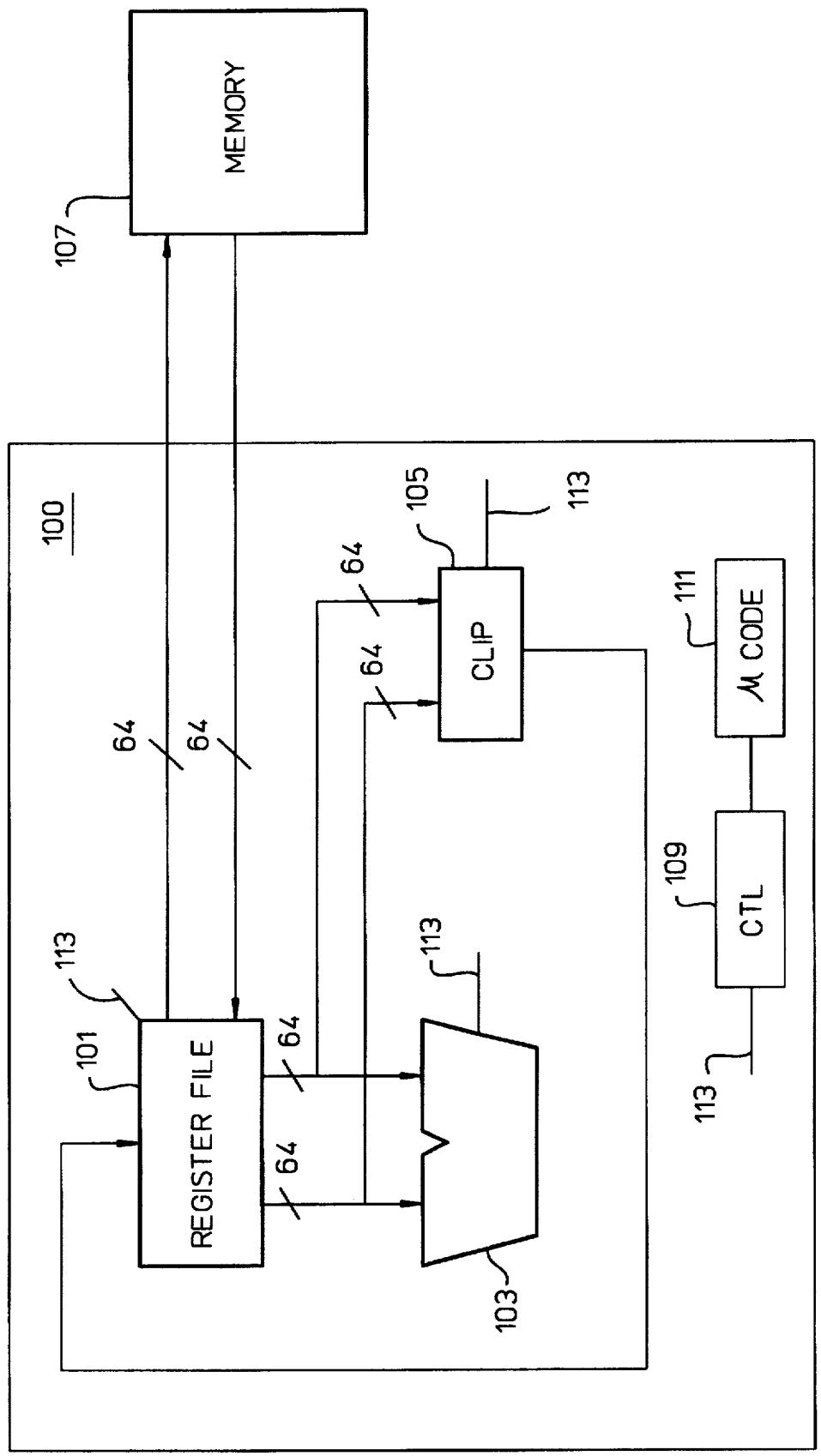
FIG. 1 is a block diagram of a processor having integer clipping circuit in accordance with a preferred embodiment of the invention.

FIG. 1 is a block diagram of a microprocessor 100 having a register file 101, an adder 103, and integer clipping circuitry 105. The adder 103 and the integer clipping circuitry 105 are both connected to accept input from the register file 101 and to return results to the register file 101. The register file 101 is further connected to a memory 107. The register file 101 is operable to selectively load its registers from the memory 107 and to store the contents of registers back into the memory 107.

The microprocessor 100 includes a control unit 109 that is connected to a micro-code memory 111. The control unit is connected via a signal path 113 to the register file 101, the adder 102, the clipping circuit 105, as well as to other components not shown. The micro-code memory 111 contains instructions for controlling the operation of the various components of the microprocessor 100. The control unit is operable to receive instructions from a program memory, e.g., the memory 107. The control unit decodes these instructions and fetches a corresponding micro-code program from the micro-code memory 111. In response to the micro-code instructions, which constitute this micro-code program, the control unit 109 sends signals via the signal path 113 to the various components of the processor 100, including the register file 101, the adder 103, and the clipping circuitry 105.

As a person skilled in the art would know, the microprocessor 100 is connected to other processors and/or peripheral devices via a bus. These components are well understood by persons skilled in the art and are, therefore, not shown.

In the preferred embodiment, the memory 107 contains addressable locations that each are 64 bits wide. Further, the registers in the register file 101 are at least 64 bits wide, the paths between the memory 107 and the register file 101, between register file 101 and the adder 103, and between the register file 101 and the clipping circuit 105 are all at least 64 bits wide.

In one application of the invention, the memory 107 contains digitized images. In image processing, it is common to perform arithmetic operations on the integers representing the data associated with a given picture element (pixel). These operations frequently extend the dynamic range of the data beyond that supported by the graphics hardware. To prevent unpredictable behavior, the data is clipped to fall in the range expected by the display hardware.

For example, a device capable of displaying 256 intensity values would have 8-bit (1 byte) pixels. A modification of the image, such as edge enhancement, done with normal, 4-byte integer arithmetic might result in some values less than 0 or greater than 255.

For illustrative purposes, consider the following 64 bits:

```
63                                                                    0    Example 1
00000000 01011100 00000000 11000010 00000000 10001101 00000000 11110010.
```

These 64 bits exemplify what may be stored in one memory location in the memory 107. In this example, each half word (16 bits) contains the numeric value for the light intensity to be displayed by one pixel. Each pixel value is held in one byte and the other byte contains zeros. Certain arithmetic operations, e.g., those associated with image compression protocols such as MPEG, may cause the pixel values to overflow the 8 bits of the least significant byte of its half word. For example, an arithmetic operation (or series of operations) may cause the following result:

```
63                                                                    0    Example 2
00000000 01101001 11111111 11001110 00001000 00110101 11110110 10101001.
```

If the dynamic range for pixel values of a device is 0 to 255, to prevent the unpredictable outputs from those half-words that are less than 0 or greater than 255, the values in the half-words are clipped to conform to the acceptable range. The clipping is done in such a fashion that negative values are replaced by 0 (00000000) and those greater than 255 are replaced by 255 (11111111).

Binary data formats exist for representing signed and unsigned integers. The 2's compliment format is the most common representation for signed integers and is used in this description of the preferred embodiments of the invention. This allows three different types of clipping depending on the input and output type, namely, clip unsigned input to unsigned output, clip signed input to unsigned output, and clip signed input to signed output. A fourth possibility is to clip unsigned input to signed output. However, according to the preferred embodiment, such a clipping is illegal and an attempt to do such a clipping results in returning the input data as the result. Of course, alternative embodiments could also allow clipping of unsigned input to signed output.

An instruction, CLIP, directs the processor 100 to clip integer values stored in a register in the register file 101. The CLIP instruction has the following format:

CLIP.xyz source, mask, target where x indicates the size of the input data—D for 64 bits, W for 32 bits, H for 16 bits, and B for 8 bits; y indicates whether the input is unsigned (U) or signed (S); and the flag z indicates whether or not the output should be clipped to an unsigned (U) or a signed (S) integer. The mask allows the integers stored in the source register to be clipped to any range. Furthermore, the mask allows clipping all the pixel values stored in the register in parallel. In one embodiment, y equals 0 for unsigned input and y equals 1 for signed input; similarly, z equals 0 for unsigned output and z equals 1 for signed output.

The mask contains a 1 for each out-of-range bit and 0 for each in-range bit.

Figure 2:
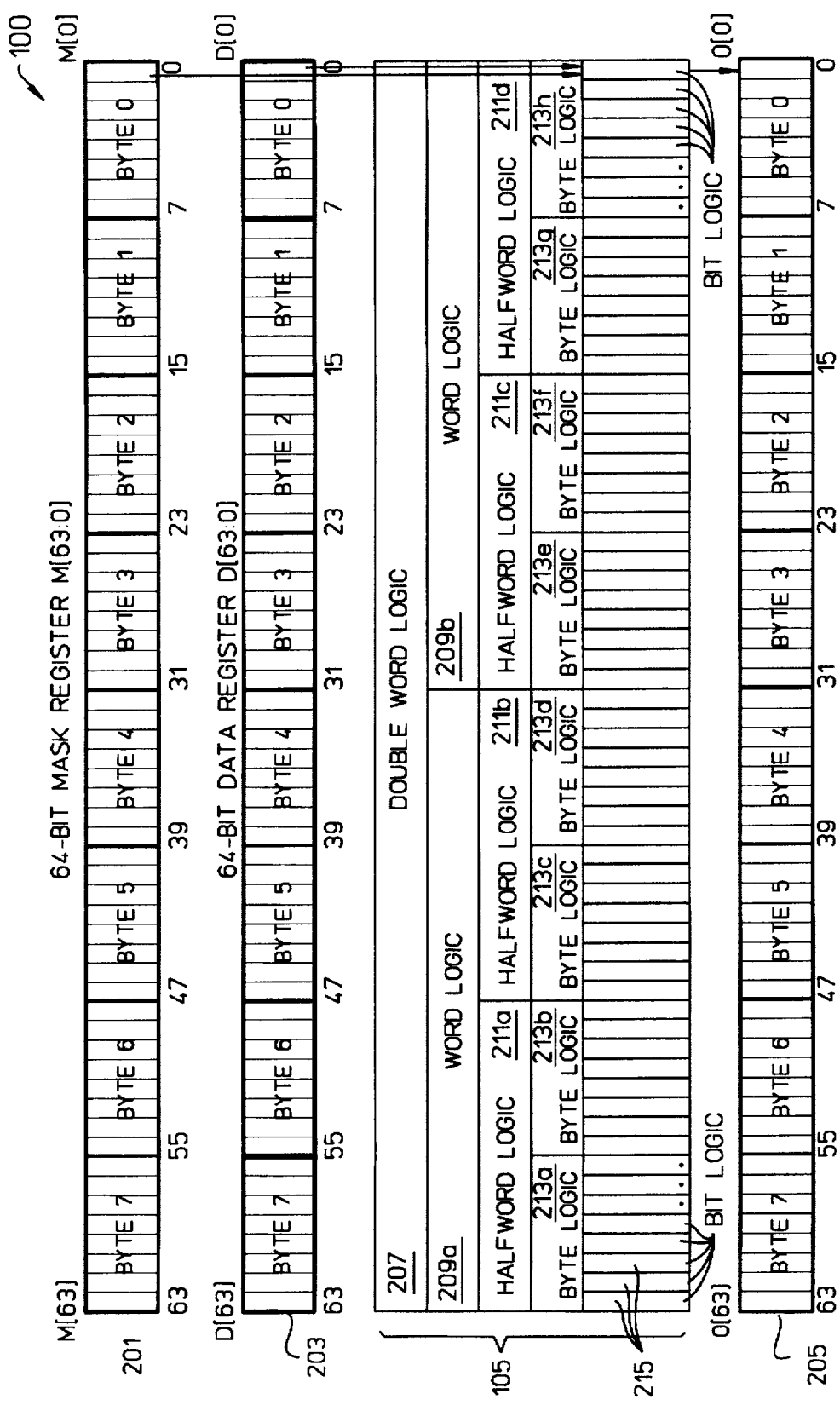
FIG. 2 is a block diagram showing the building blocks of the clipping circuit in accordance with a preferred embodiment of the invention and the data, mask, and output registers.

FIG. 2 is a block diagram of certain components of the microprocessor 100; namely, it shows the building blocks of the clipping circuit 105 and the data, mask, and output registers. The microprocessor 100 contains a mask register 201, a data register 203, and an output register 205. Each register 201 through 205 is contained in the register file 101. The CLIP instruction indicates to the processor 100 which register in the register file to use for data, mask, and output register, respectively.

The microprocessor 100 also contains the clip logic 105. The clip logic 105 is connected to each register 201 through 205.

The clip logic 105 is built from a set of replicated circuits. The clip logic 105 contains one double word logic circuit 207, two word logic circuits 209a–b, four half-word logic circuits 211a–d, eight byte logic circuits 213a–h, and 64 bit logic circuits 215 (not individually named). The word logic circuits 209 are identical to each other, the half-word logic circuits 211 are identical to each other, the byte logic circuits 213 are identical to each other, and the bit logic circuits 215 are identical to each other. What differentiates the various replicated circuits from one another is how it is connected to other circuit components. Those connections are discussed below in conjunction with FIGS. 3 through 5. Each bit of the mask register 201 and of the data register 203 is connected as input to a corresponding bit logic 215. Similarly, each bit of the output register is connected as an output to the corresponding bit logic 215.

The parallel integer input data is divided into one or more input blocks. For example, each input block could be a half-word in which case, supposing 64-bit wide input data, there would be four input blocks, each being 16 bits wide.

Figure 3:
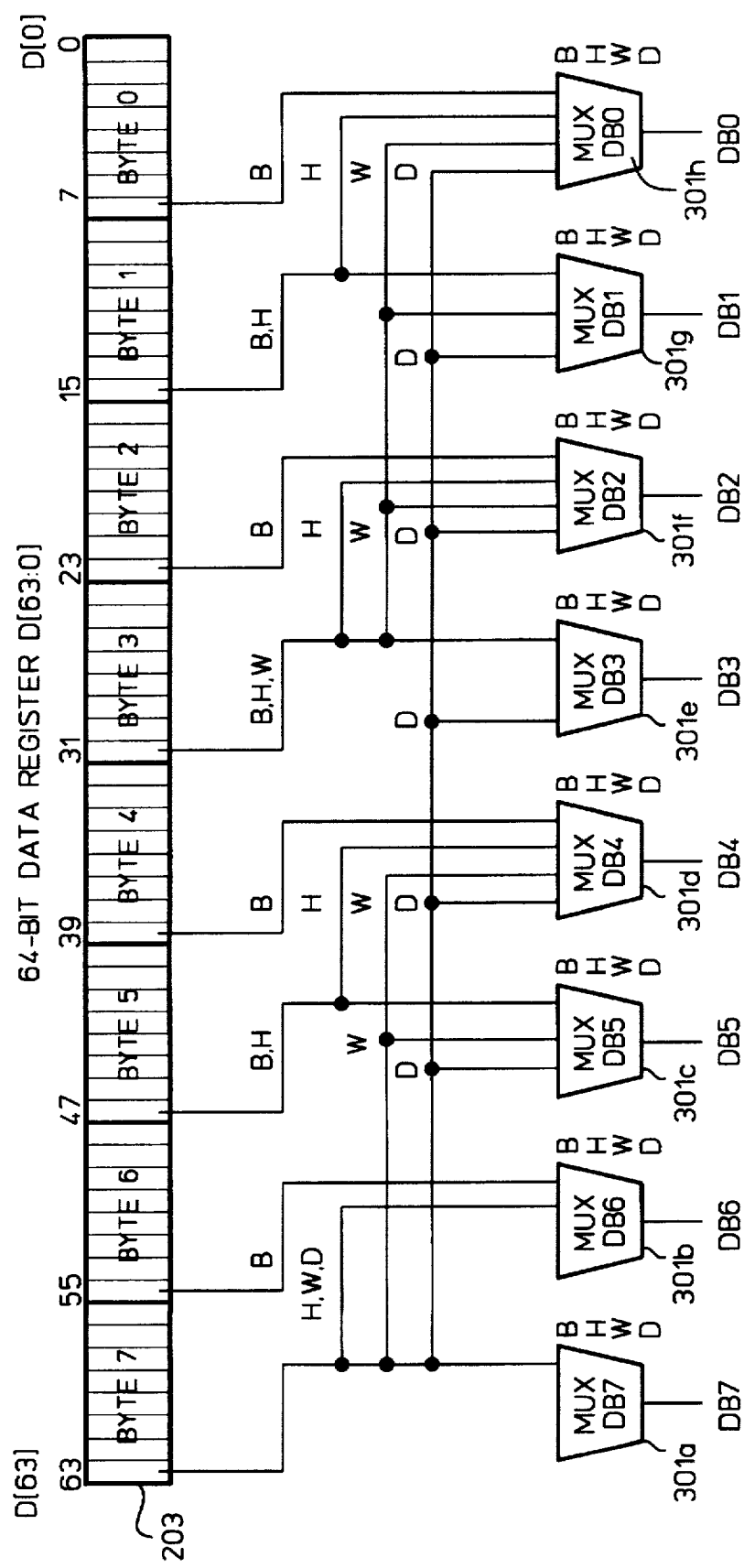
FIG. 3 is a block diagram showing circuitry for determining the value of the sign bit of the input bucket corresponding to each byte of output data.

FIG. 3 is a block diagram of the double word logic 207. This figure shows the circuitry for determining the value of the sign bit of the input data block corresponding to each byte of output data. The high order bit of each byte in the data register is connected to one or more muxes 301a through 301h. For example, bit 63 is connected to all of the muxes, and bit 7 is connected only to mux 301a. Each mux is selected using the BHWD control lines. The BHWD control lines are set from the value of the X field of the CLIP instruction. Outputs DB0 through DB7 are inputs to the logic 105 in FIG. 2, and more specifically to the SIGN input in logic 215 in FIG. 6. Output DB0 through DB7 control these sign inputs on B0 through B7 in logic 213 in FIG. 2 (in the preferred embodiement, DB0 thorough DB7 are set to 0 for unsigned input).

The following table shows for each mux from which bit of the data register 203 the output of that mux is taken depending on the value of the BHWD control lines.

TABLE 1

| MUX | Byte (B) | Half-word (H) | Word (W) | Double-word (D) |
|---|---|---|---|---|
| 301 a | 63 | 63 | 63 | 63 |
| 301 b | 55 | 63 | 63 | 63 |
| 301 c | 47 | 47 | 63 | 63 |
| 301 d | 39 | 47 | 63 | 63 |
| 301 e | 31 | 31 | 31 | 63 |
| 301 f | 23 | 31 | 31 | 63 |
| 301 g | 15 | 15 | 31 | 63 |
| 301 h | 7 | 15 | 31 | 63 |

Table 2, below, contains pseudo-code for each type of clipping operation. The pseudo-code is with respect to each datum (e.g., byte, half word, word, double word) in the data register 203. In table 2 the notation "OR (M(i)D(i))" means that "for all values i, AND M(i) and D(i), and OR the results" (e.g., if M=0000 and D=0101, OR (M(i)D(i))=0, if M=0100 and D=0101, OR (M(i)D(i))=1).

TABLE 2

| Type of clipping | For each datum k (e.g., for byte clipping, for each byte; for word clipping, for each word): where DB(k) = the sign bit for the datum k (it is assumed that DB(k) = 0 for unsigned input); and where D(i) is the data bit for i-th bit, M(i) is the mask bit for the i-th bit, M are mask bits that have the value 1. |
|---|---|
| signed input/ signed output | if for each i in M: if OR (M(i)D(i)) = DB(k) then clip = 0 else {i.e., OR (M(i)D(i)) ≠ DB(k)} clip = 1; for each i in the datum(k)do if clip = 0 then O(i) = D(i) else if clip = 1 then if DB(k) = 0 then O(i) = not_M(i) else_O(i) = M(i) |
| signed input/ unsigned output | clip = OR (M(i)D(i)) (i.e., clip is 1 if any D(i) is 1 where M(i) is 1) if clip=0 then O(i)=D(i) else if clip=1 then if DB(k)=1 then O(i)=0 else if DB(k)=0 then O(i)= x not_M(i) |
| unsigned input/ unsigned output | clip = OR (M(i)D(i)) (i.e., clip is 1 if any D(i) is 1 where M(i) is 1) if clip=0 then O(i)=D(i) else if clip=1 then O(i)= x not_M(i) |

For this embodiment, wherein the type of the input and the output is obtained from the clip instruction opcode, no data type information is encoded into the mask. Therefore, the mask does not depend upon the data type of the inputs and outputs, except that for signed output the mask also contains a 1 for the sign bit of each datum. For example, the mask applied to clip either signed or unsigned half word (16 bits) integer inputs to a unsigned byte (8 bits) integer output is shown below:

63                                                                                    0   Example 3(a)
11111111 00000000 11111111 00000000 11111111 00000000 11111111 00000000.

The equivalent mask for clipping a signed input to a signed byte result is shown below:

63                                                                                    0   Example 3(b)
11111111 10000000 11111111 10000000 11111111 10000000 11111111 10000000.

When the mask shown as the bit pattern of Example 3(a) is applied to the unsigned input word shown as bit pattern(2) the following unsigned integer result is obtained (the first line is the input bit pattern of Example 2, the second line is the mask bit pattern of Example 3(a), and the third line is the result):

63                                                                                    0   Example 4
00000000 01101001 11111111 11001110 00001000 00110101 11110110 10101001
11111111 00000000 11111111 00000000 11111111 00000000 11111111 00000000
00000000 01101001 00000000 11111111 00000000 11111111 00000000 11111111.

When the mask shown as the bit pattern of Example 3 (b) is applied to the signed input word shown as bit pattern(2) the following signed integer result is obtained (the first line is the input bit pattern of Example 2, the second line is the mask bit pattern of Example 3(b) , and the third line is the result):

63                                                                                    0   Example 5
00000000 01101001 11111111 11001110 00001000 00110101 11110110 10101001
11111111 10000000 11111111 10000000 11111111 10000000 11111111 10000000
00000000 01101001 11111111 11001110 00000000 01111111 11111111 10000000.

When the mask shown as the bit pattern of Example 3(a) is applied to the signed input word shown as bit pattern(2) the following unsigned integer result is obtained (the first line is the input bit pattern of Example 2, the second line is the mask bit pattern of Example 3(a), and the third line is the result):

63                                                                                    0   Example 6
00000000 01101001 11111111 11001110 00001000 00110101 11110110 01001001
11111111 00000000 11111111 00000000 11111111 00000000 11111111 00000000
00000000 01101001 00000000 00000000 00000000 11111111 00000000 00000000.

Figure 4A:
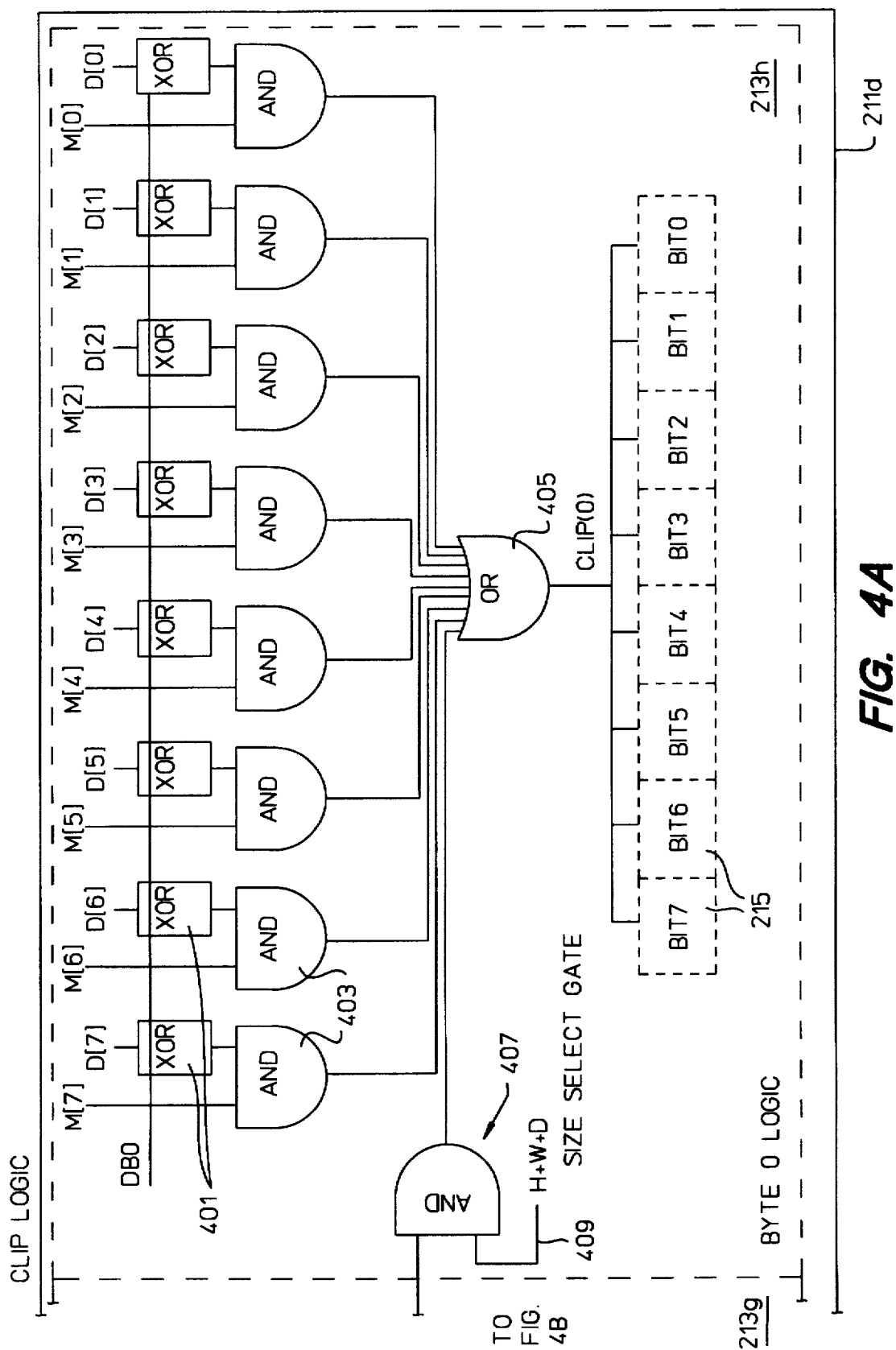
FIGS. 4A and 4B is a block diagram showing details of the half-word and byte logic circuits of the clipping circuit of FIG. 2.
Figure 4B:
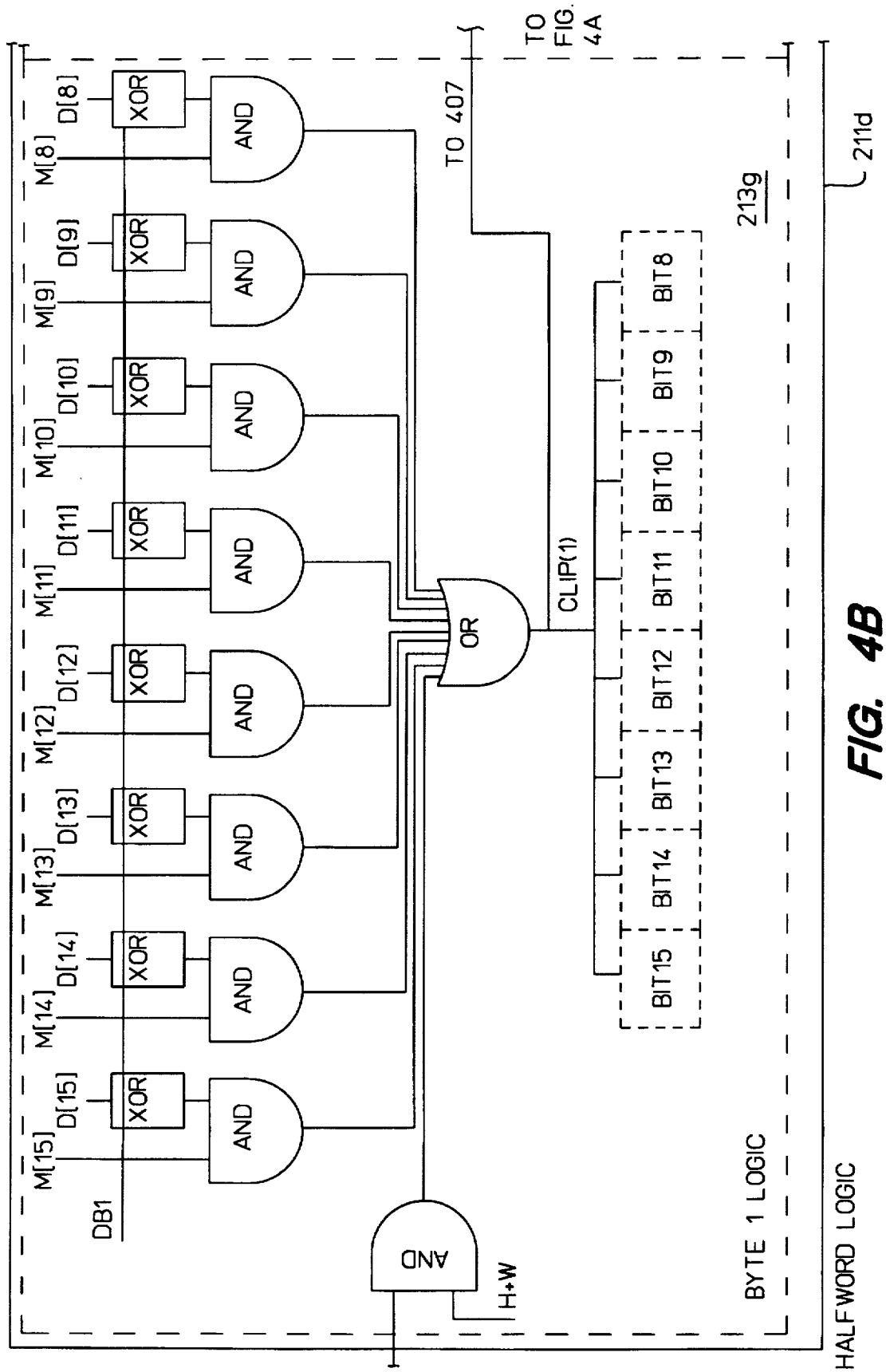

FIG. 4 is a schematic of one of the half word logic circuits, namely, the half word logic circuit 211d. The half word logic 211d contains the two byte logic circuits 213g and 213h. The byte logic circuit 213h corresponds to bits 0 through 7 of the data, mask and output words. Similarly, the byte logic circuit 213g corresponds to bits 8 through 15. Each of the byte logic circuits 213 contain bit logic circuits 215 for each bit to which it corresponds.

The data and mask registers are connected to the clip logic so that the bits in the data and mask registers that correspond to one another are input into the byte logic circuit 213 to which those bits correspond. The byte logic circuits each contain eight XOR gates 401, each corresponding to one data bit. Each of the XOR gates 401 have two inputs, namely, the data bit to which it corresponds and the sign bit, which is determined for the corresponding byte as shown in FIG. 3.

The outputs from the XOR gates 401 are bitwise-ANDed with their corresponding MASK bits in AND gates 403. The outputs from these ANDing operations are ORed (in gate 405) together with the output from a size select gate 407. The output of the OR gate 405 is the CLIP signal of the pseudo-code of Table 2. The CLIP signal indicates whether the data needs to be clipped or if it can be passed through to the output register 205. The CLIP signal is input to each of the bit logic circuits 215.

Figure 5:
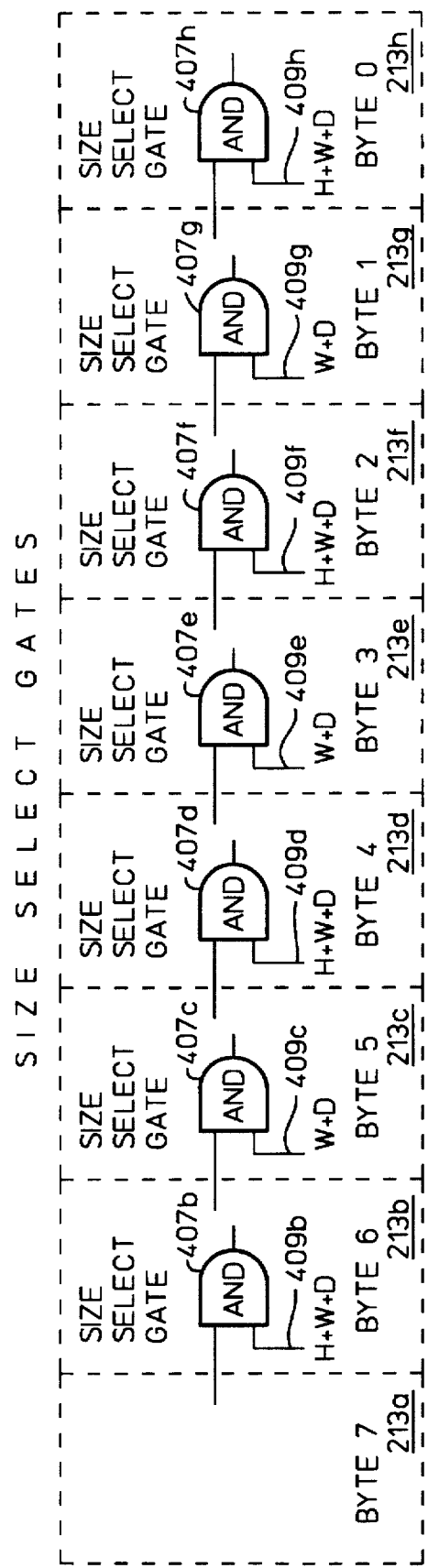
FIG. 5 is a block diagram showing the size select gate of each byte logic circuit of FIG. 4.

Each byte logic circuit 213, except for the highest order byte logic circuit 213a, has a size select gate 407. Each size select gate 407 is an AND gate. One input to each size select gate 407 is the value of the CLIP signal for the next higher order byte logic circuit 213. Each of the size select gates 407 also receives as input a signal 409 that indicates whether the next higher order byte is part of the same input data as the present byte. The signal 409 depends on the size of the input block and where the particular byte in question fits into the input register 203. FIG. 5 shows the inputs to the various size select gates 407 for the eight bytes in a 64 bit register. For each of byte logic circuits 213b, 213d, 213f, and 213h, the signal 409 is the value "H or W or D", where H is 1 if the input register is divided on half-word boundaries, W is 1 if the input register is divided on word-boundaries, and D is 1 if the input register is divided on double-word boundaries (i.e., the register has only one input). If H, W, and D are all zero, the input register is divided on byte boundaries. For each of byte logic circuits 213c, 213e, and 213g, the signal 409 is "W or D".

Table 3 below is a truth table for the operation of the bit logic circuits 215 in FIG. 6. Table 3 is divided into three sub-tables, one for signed-input/signed-output Table 3a, one for signed-input/unsigned-output Table 3b, and one for unsigned-input/unsigned-output Table 3c.

TABLE 3a

Truth table for bit logic 215 for signed-input/signed-output case.

| clip | db(k) (sign) | m(i) (mask) | d(i) (data) | output(i) |
|---|---|---|---|---|
| 0 | 0 | 0 | 0 | 0 |
| 0 | 0 | 0 | 1 | 1 |
| 0 | 0 | 1 | 0 | 0 |
| 0 | 0 | 1 | 1 | 1 |
| 0 | 1 | 0 | 0 | 0 |
| 0 | 1 | 0 | 1 | 1 |
| 0 | 1 | 1 | 0 | 0 |
| 0 | 1 | 1 | 1 | 1 |
| 1 | 0 | 0 | 0 | 1 |
| 1 | 0 | 0 | 1 | 1 |
| 1 | 0 | 1 | 0 | 0 |
| 1 | 0 | 1 | 1 | 0 |
| 1 | 1 | 0 | 0 | 0 |
| 1 | 1 | 0 | 1 | 0 |
| 1 | 1 | 1 | 0 | 1 |
| 1 | 1 | 1 | 1 | 1 |

TABLE 3b

Truth Table for bit logic 215 for signed-input/unsigned-output case.

| clip | db(k) (sign) | m(i) (mask) | d(i) (data) | output(i) |
|---|---|---|---|---|
| 0 | 0 | 0 | 0 | 0 |
| 0 | 0 | 0 | 1 | 1 |
| 0 | 0 | 1 | 0 | 0 |
| 0 | 0 | 1 | 1 | 1 |
| 0 | 0 | 0 | 0 | 0 |
| 0 | 1 | 0 | 1 | 1 |
| 0 | 1 | 1 | 0 | 0 |
| 0 | 1 | 1 | 1 | 1 |
| 1 | 0 | 0 | 0 | 1 |
| 1 | 0 | 0 | 1 | 1 |
| 1 | 0 | 1 | 0 | 0 |
| 1 | 0 | 1 | 1 | 0 |
| 1 | 1 | 0 | 0 | 0 |
| 1 | 1 | 0 | 1 | 0 |
| 1 | 1 | 1 | 0 | 0 |
| 1 | 1 | 1 | 1 | 0 |

TABLE 3c

Truth Table for bit logic 215 for the unsigned-input/unsigned-output case.

| clip | db(k) (sign) | m(i) (mask) | d(i) (data) | output(i) |
|---|---|---|---|---|
| 0 | 0 | 0 | 0 | 0 |
| 0 | 0 | 0 | 1 | 1 |
| 0 | 0 | 1 | 0 | 0 |
| 0 | 0 | 1 | 1 | 1 |
| 0 | 1 | 0 | 0 | 0 |
| 0 | 1 | 0 | 1 | 1 |
| 0 | 1 | 1 | 0 | 0 |
| 0 | 1 | 1 | 1 | 1 |
| 1 | 0 | 0 | 0 | 1 |
| 1 | 0 | 0 | 1 | 1 |
| 1 | 0 | 1 | 0 | 0 |
| 1 | 0 | 1 | 1 | 0 |
| 1 | 1 | 0 | 0 | 1 |
| 1 | 1 | 0 | 1 | 1 |
| 1 | 1 | 1 | 0 | 0 |
| 1 | 1 | 1 | 1 | 0 |

Figure 6:
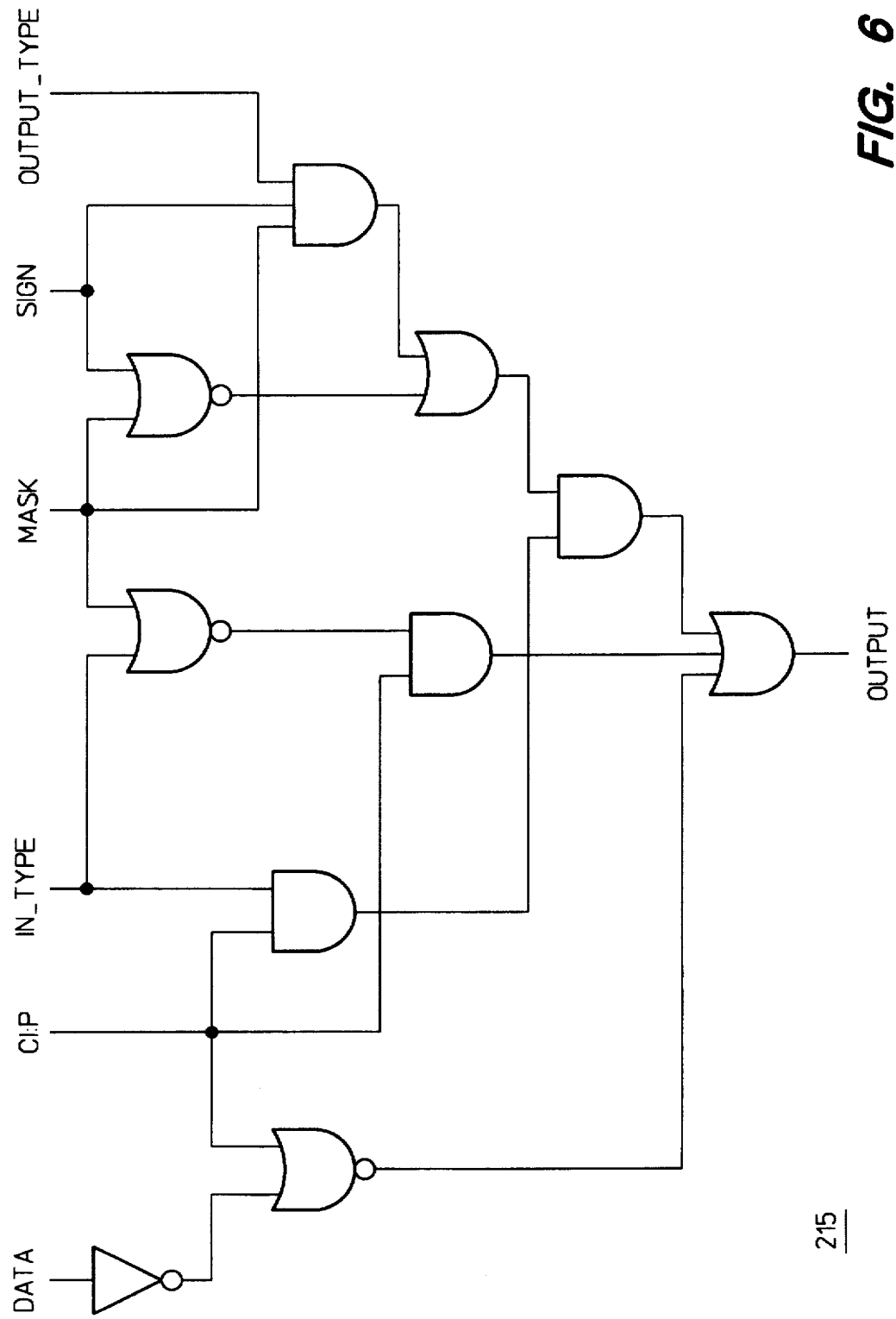
FIG. 6 is a logic diagram of the bit logic circuit of the byte logic circuits of FIG. 4.

FIG. 6 is a schematic of the bit logic circuits 215 corresponding to the truth tables of Table 3.

In the embodiment discussed above in conjunction with FIGS. 1 through 6 the type of clipping is indicated by the instruction itself, by way of two opcode completer bits, y and z, and passed to the clipping circuit as signals IN—TYPE and OUT—TYPE. There are three alternative embodiments that use bits in the mask register to remove some or all of the requirement for having opcode completer bits y (signed/unsigned input) and/or z (signed/unsigned output).

The three alternative embodiments are summarized in Table 4.

TABLE 4

Use of Mask and completer bits to indicate data type of input and output in alternative embodiments.

| Embodiment | |
|---|---|
| Embodiment II. | Mask: AXXX XXXX XXXX XXXX<br>A:input type; A=0, signed; A=1, unsigned<br>z completer in opcode controls output type selection. |
| Embodiment III. | Mask: ABXX XXXX XXXX XXXX<br>A:input type; A=0, signed; A=1, unsigned<br>IF A=1, B is not controllable<br>B: output, iff A indicates signed input,<br>B=0, signed output<br>B=1, unsigned output. |
| Embodiment IV. | Mask: AXXX XXXX XXXX XXXX<br>A:output type; A=0, signed; A=1, unsigned<br>y completer in opcode for input type selection. |

In the second embodiment, the most significant bit of the mask, bit A, is used to indicate if the input data is signed or unsigned (An opcode completer, z, contains the output data type selection). This can be done because there is no reason to clip a 16 bit signed input to a 16 bit signed output; and for 16 bit signed input data, the 16 th bit must be the sign bit and hence would never be masked off. In the embodiment described below, for signed input data, A equals 0, and for unsigned input data, A equals 1.

In the third embodiment, the most significant bit in the mask, bit A, is used to indicate if the input data is signed or unsigned. If the input data is signed, the mask bit B tells the hardware state machine if the output should be clipped to a signed or unsigned value, thereby removing the need for opcode completer z. When B equals to 0, the hardware clips the output to signed integers, and when B equals 1, the hardware clips to unsigned integers. It is possible to use bit B to encode the output data type because when clipping to a 15 bit signed output, the fifteenth bit, which is the bit under mask bit B control, is the sign bit, and, thus, does not need to be clipped.

In the fourth embodiment, opcode completer bit y controls the input data type and mask bit A controls the output. When A equals 0, the hardware clips to signed output, and when A equals 1, the hardware clips to unsigned output. The use of the opcode completer y on the input specification provides the hardware earlier knowledge of the input typing to ease timing.

Table 4a contains examples for the fourth embodiment and the case where the input is a half word for the case of signed output.

TABLE 4a

Examples of clipping using one completer bit and signed output.

```
1x0x xxxx xxxx xxxx  (signed data)
0111 1111 1000 0000  (mask)
1111 1111 1000 0000  (signed result = -128)
0x1x xxxx xxxx xxxx  (signed data)
0111 1111 1000 0000  (mask)
0000 0000 0111 1111  (signed result = 127)
1xxx xxxx xxxx xxxx  (signed data)
1111 1111 0000 0000  (mask)
0000 0000 0000 0000  (unsigned result = 0)
0x1x xxxx xxxx xxxx  (signed data)
1111 1111 0000 0000  (mask)
0000 0000 1111 1111  (unsigned result = 255)
```

The sign bit of the mask indicates whether the input is treated as signed or unsigned. The following pseudo code describes the clipping operation:

TABLE 4b

Pseudo-code for clipping to signed output using one completer bit

```
sb := sign bit of input;
IF mask[sb] == 0
    IF any bit in (mask && data) != data[sb]
        IF data[sb] == 1
            result := mask
        ELSE
            result := !mask
    ELSE result := data
ELSE
    IF data[sb] == 1
        result := 0
    ELSE IF mask && data != 0
        mask[sb] := !mask[sb]
        result := !mask
    ELSE
        result := data.
```

TABLE 4c

Clipping to unsigned result using one completer bit.

```
CLIP, U data, mask, result
1xxx xxxx xxxx xxxx  (unsigned data)
1111 1111 0000 0000  (mask)
0000 0000 1111 1111  (result = 255)
```

TABLE 4d

Pseuso-code for clipping to unsigned result using one completer bit.

```
IF mask && data != 0
    result := !mask
ELSE
    result := data.
```

The third embodiment uses the fact that the leading bit of the mask is always 1 for unsigned case. This is due to the fact that clipping to the full width of the input data is not necessary, e.g., for half-words clipping to the full 16-bit range is never done. Similarly, for signed output, it does not make sense to clip to a 15-bit signed range. Therefore, it is possible to use the two leading bits of the mask to distinguish the cases.

The following half-word examples illustrate the third embodiment:

TABLE 5

Examples of clipping where clipping type is encoded in the first two bits of the mask.

CLIP data, mask, result

```
1x0x xxxx xxxx xxxx  (signed data)
0011 1111 1000 0000  (mask)
1111 1111 1000 0000  (result = -128)
0x1x xxxx xxxx xxxx  (signed data)
0011 1111 1000 0000  (mask)
0000 0000 0111 1111  (signed result = 127)
11xx xxxx xxxx xxxx  (signed data)
0111 1111 0000 0000  (mask)
0000 0000 0000 0000  (unsigned result = 0)
0x1x xxxx xxxx xxxx  (signed data)
0111 1111 0000 0000  (mask)
0000 0000 1111 1111  (unsigned result = 255)
1xxx xxxx xxxx xxxx  (unsigned data)
1111 1111 0000 0000  (mask)
0000 0000 1111 1111  (unsigned result = 255)
```

TABLE 5b

Pseudo-code for clipping where type of clipping is encoded in the first two bits of the mask.

```
sb := sign bit;
sb2 := sb - 0;
IF mask[sb:sb2] == 10
    mask[sb:sb2] := 01
    if any bit in (mask && data) != data[sb]
        if data[sb] == 1
            result := mask
        else
            result := !mask;
    else
        result := data;
ELSE IF mask[sb:sb2] == 01
    if data[sb] == 1
        result := 0
    else if mask && data != 0
        mask[sb] := !mask[sb]
        result := !mask;
    else
        result := data
else if mask[sb:sb2] == 11
    if mask && data != 0
        result := !mask
    else
        result := data
else
    ERROR! when mask[sb:sb2] = 10.
```

The clipping logic 105 is operable to use either of the three alternative embodiments.

An alternative embodiment allows for variable width integers. In the alternative embodiment, each integer to be clipped may be of different width than each other integer stored in a common register, and each integer may be clipped to a different range.

As an example, the following 64-bit bit pattern contains six input elements, each 10 bits wide:

| 6 | 5 | 4 | 3 | 2 | 1 | Example 7 |
|---|---|---|---|---|---|---|
| 0000 000001 1010 | 0111 1001 10 | 1110 111000 | 1010 000011 | 0101 111101 | 0010 101001. | |

Numbers 1 and 6 are positive numbers that fit in the output range; numbers 2 and 5 are positive numbers that do not fit the output range; number 4 is a negative number that fits in the output range; and number 3 is a negative number that does not fit in the signed output range. The pseudo code of the first embodiment is applied for clipping. The following bit pattern is used to clip six ten-bit numbers to an 8-bit unsigned range:

0000 1100000000 1100000000 1100000000 1100000000 1100000000 1100000000. Example 8

The pseudo-code of Table 1 is used to perform the clipping operation. Applying the bit pattern of Example 8 to the bit pattern of Example 7, using the method of the pseudocode of Table 1, results in the following output:

0000 0000011010 0011111111 0000000000 0000000000 0011111111 0010101001. Example 9

To clip an input to an eight-bit signed range the following mask bit pattern is applied:

0000 1110000000 1110000000 1110000000 1110000000 1110000000 1110000000. Example 10

Applying the mask of Example 10 to the input of Example 7 using the signed output pseudo-code of Table 1 produces the following result:

0000 0000011010 0001111111 1110111000 1110000000 001111111 0010101001

The clipping instructions for the unsigned and signed integer clipping of the alternative embodiment, is:

CLIP,*t* source, mask, target where t is either U, for unsigned, or S, for signed.

Note that the instruction gives no indication of input data size or whether parallel execution is to be used. The hardware automatically infers this information from the mask. The data is assumed to be right justified in the register. The first 1 in the mask indicates the position of the sign bit of the first data element; the first 0 indicates the position of the highest order bit in the output field. The next 1 indicates the sign of the next number; the next 0 indicates the highest order bit in the next output field, and so on, until the end of the mask word.

The many features and advantages of the present invention are apparent from the written description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of operating a digital processor to clip binary input integers to a specified range using one instruction, comprising the steps of:

(a) defining a clip instruction having a mask field;

(b) accepting a mask from said mask field wherein a bit is set in said mask for each out-of-range bit and not set for in-range bits;

(c) determining from the mask bits and data bits whether the input is out-of-range for the output;

(d) using a defined boolean relationship, applying said mask to said input integers so that any input integers outside of said range is clipped to the quantity in the range closest to said integer, thereby producing output integers within a range specified by said mask.

2. The method of claim 1 wherein said masking operation is performed according to the following steps:

using said mask to determine for each byte whether clipping is necessary;

if clipping is necessary using said mask to define where to set the output to zero and where to set the output to one.

3. The method of claim 2 where the step of determining whether clipping is necessary comprises the further step of obtaining a clip signal of a next higher order byte and ANDing said higher order clip signal with a size expression for said byte, thereby producing a size select signal for said byte.

4. The method of claim 3 further comprising the step of ANDing the input bits in the byte with their corresponding mask bits.

5. The method of claim 4 further comprising the step of ORing the results of ANDing the input bits and the mask bits with the size select signal for said byte.

6. The method of claim 1 wherein said clipping instruction causes said digital processor to clip input integers having a first data type to output integers having a second data type.

7. The method of claim 6 wherein said first data type and said second data type are selected from the group containing the elements signed data and unsigned data.

8. The method of claim 7 wherein said clipping instruction may indicate input data of both signed and unsigned integers and output clipped data of both signed and unsigned integers and wherein opcode completer bits of said instruction indicates the data types of integers in said input data and in said output data.

9. The method of claim 8 wherein said clipping instruction contains opcode completer bits for specifying said data types.

10. The method of claim 8 wherein said mask contains codes for specifying said data types.

11. The method of claim 7 wherein said clipping instruction may indicate input data of both signed and unsigned integers and output clipped data of both signed and unsigned integers and wherein said mask indicates the data types of integers in said input data and in said output data.

12. The method of claim 1 wherein said masking operation is performed according to the following steps:

determine for each byte in the output whether clipping is necessary;

determine clipping type;
for signed input to signed output:
  if clipping is not necessary,
    for each set mask bit set the output bit to the sign bit of the input data block
    for each other bit set the output bit to the data bit
  if clipping is necessary,
    where the mask is set, set the output bit to the sign bit of the input data block
    where the mask is not set, set the output bit to the inverse of the sign bit of the input data block;
for signed input to unsigned output:
  if clipping is not necessary
    if the input is negative, set the output to 0
    if the input is positive, where the mask is zero copy the input to the output and
    where the mask is 1 set the output to 0
  else if clipping is necessary
    if the input is negative, set the output to 0
    else set the output to NOT mask;
for unsigned input to unsigned output:
  if clipping is not necessary write the input byte into the output destination
  else if clipping is necessary where the mask is set, set the output to 0 and where the mask is not set, set the output to 1.

13. A method of operating a digital processor to clip binary input integers in parallel, comprising the steps of:
(a) accepting input data having at least one input data block;
(b) accepting a mask having a bit corresponding to each bit in said input data;
(c) using a defined logic relationship, determining from said mask and data whether each input datum in each said data block represents an out-of-range datum; and
(d) using a second defined logic relationship, applying said mask to said input data so that each input data block in said input data is clipped in parallel to produce output data containing said clipped integers.

14. The method of claim 13 wherein said digital processor clips said integers in response to a single instruction having a mask field, a data field, and an output field, and wherein said mask field points to said mask, said data field points to said input data; and said output field points to a storage location for said output data.

15. The method of claim 14 wherein said input integers and said output clipped integers are of specified data types from the set of unsigned integers and signed integers.

16. The method of claim 15 wherein said data types of said input integers and output integers is indicated by op code completer bits.

17. The method of claim 15 wherein at least one of said data types of said input integers and output integers is indicated by codes contained in said mask.

18. A circuit for clipping integers stored in an input source logically divided into at least one input data block, each input data block having a size, to produce a clipped result stored in an output destination, comprising:
a control circuit operable to accept a clip instruction as input, said clip instruction defining the size of said input data blocks, wherein each input data block contains one integer;
a mask source connected to said control circuit for storing a mask corresponding to each input data block;
a clip determination circuit operable, according to a defined logic relationship, to compare said mask to said input stored in said input source thereby determining whether clipping is required for each output block and to produce a clip signal whose value depends on said clip determination; and
at least one bit-level clip circuit connected to said clip determination circuit, said input source, said mask source, and said output destination such that each bit-level clip circuit provides a one-to-one mapping between said input source and said output source, and wherein all bit-level clip circuits corresponding to one input data block are collectively selectively operable, responsive to said clip signal, to apply said mask, according to a second defined logic relationship, to said input so that those bits corresponding to in-range bits in said output destination are set to a bit pattern that represents an in-range number closest in value to the value of the integer contained in said input data block.

19. The circuit of claim 18 wherein each output block is a byte; and wherein said clip determination circuit produces a clip signal for each byte in said output destination.

20. The circuit of claim 18 wherein said clip instruction specifies that each input data block is selected from the set of double word, word, half word, and byte.

21. The circuit of claim 20 wherein said circuit for clipping integers each integer stored in said input source has a sign bit and wherein said circuit is hierarchically organized and further comprises:
a byte sign select circuit;
at least one byte-level circuit connected to said sign select circuit such that the sign select circuit provides to said byte-level circuit the value of the sign bit of the integer corresponding to said byte-level circuit and wherein said byte-level circuit contains a plurality of said bit-level circuits.

22. The circuit of claim 21 further comprising at least one additional level of hierarchical circuits each containing at least one byte-level circuit wherein control signals are routed from said additional levels of hierarchical circuits through said byte-level circuits to said bit-level circuits such that each said bit-level circuit responds to said clip signal to selectively apply said mask to a bit in said input data corresponding to said bit-level circuit.

23. The circuit of claim 21 wherein the clip determination circuit is divided over said byte-level circuits such that each byte-level circuit, except for the byte-level circuit of highest order, contains a size select AND gate with one input connected to the clip signal of the next higher order byte-level circuit and a second input connected to a signal line whose value depends on the size of the input data block and the byte-level circuits location relative to other byte-level circuits.

24. The circuit of claim 21 wherein each bit-level circuit is connected to said byte-level clip signal (c), said byte sign select circuit (db), a mask bit in said mask corresponding to said bit-level circuit (m), a data bit in said input source corresponding to said bit-level circuit (d), and a clipping-type signal and wherein said bit-level circuit comprises a plurality of logic gates which produces an output bit (o) according to a truth table.

25. The clip circuit of claim 24 wherein said truth table has the following values for signed input-to-signed output clipping:

| clip (c) | byte sign (db) | mask (m) | data (d) | output (o) |
| --- | --- | --- | --- | --- |
| 0 | 0 | 0 | 0 | 0 |
| 0 | 0 | 0 | 1 | 1 |
| 0 | 0 | 1 | 0 | 0 |
| 0 | 0 | 1 | 1 | 0 |
| 0 | 1 | 0 | 0 | 0 |
| 0 | 1 | 0 | 1 | 1 |
| 0 | 1 | 1 | 0 | 1 |
| 0 | 1 | 1 | 1 | 1 |
| 1 | 0 | 0 | 0 | 1 |
| 1 | 0 | 0 | 1 | 1 |
| 1 | 0 | 1 | 0 | 0 |
| 1 | 0 | 1 | 1 | 0 |
| 1 | 1 | 0 | 0 | 0 |
| 1 | 1 | 0 | 1 | 0 |
| 1 | 1 | 1 | 0 | 1 |
| 1 | 1 | 1 | 1 | 1 | and the following values for signed input-to-unsigned output clipping:

| clip (c) | byte sign (db) | mask (m) | data (d) | output (o) |
| --- | --- | --- | --- | --- |
| 0 | 0 | 0 | 0 | 0 |
| 0 | 0 | 0 | 1 | 1 |
| 0 | 0 | 1 | 0 | 0 |
| 0 | 0 | 1 | 1 | 0 |
| 0 | 1 | 0 | 0 | 0 |
| 0 | 1 | 0 | 1 | 0 |
| 0 | 1 | 1 | 0 | 0 |
| 0 | 1 | 1 | 1 | 0 |
| 1 | 0 | 0 | 0 | 1 |
| 1 | 0 | 0 | 1 | 1 |
| 1 | 0 | 1 | 0 | 0 |
| 1 | 0 | 1 | 1 | 0 |
| 1 | 1 | 0 | 1 | 0 |
| 1 | 1 | 1 | 0 | 0 |
| 1 | 1 | 1 | 1 | 0 | and the following values for unsigned input-to-unsigned output clipping:

| clip (c) | byte sign (db) | mask (m) | data (d) | output (o) |
| --- | --- | --- | --- | --- |
| 0 | 0 | 0 | 0 | 0 |
| 0 | 0 | 0 | 1 | 1 |
| 0 | 0 | 1 | 0 | 0 |
| 0 | 0 | 1 | 1 | 0 |
| 0 | 1 | 0 | 0 | 0 |
| 0 | 1 | 0 | 1 | 1 |
| 0 | 1 | 1 | 0 | 0 |
| 0 | 1 | 1 | 1 | 0 |
| 1 | 0 | 0 | 0 | 1 |
| 1 | 0 | 0 | 1 | 1 |
| 1 | 0 | 1 | 0 | 0 |
| 1 | 0 | 1 | 1 | 0 |
| 1 | 1 | 0 | 0 | 1 |
| 1 | 1 | 0 | 1 | 1 |
| 1 | 1 | 1 | 0 | 0 |
| 1 | 1 | 1 | 1 | 0 |

26. The circuit of claim 18 wherein clipping is done according to a clipping type selected from the group having the members signed input-to-signed output, signed input-to-unsigned output, and unsigned input-to-unsigned output.

27. The circuit of claim 26 wherein said clipping type is encoded in said mask.

* * * * *